(12) United States Patent
de Marco

(10) Patent No.: US 10,511,225 B1
(45) Date of Patent: Dec. 17, 2019

(54) LOW IQ HYSTERETIC-PWM AUTOMATED HYBRID CONTROL ARCHITECTURE FOR A SWITCHING CONVERTER

(71) Applicant: Dialog Semiconductor (UK) Limited, London (GB)

(72) Inventor: Louis de Marco, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/124,565

(22) Filed: Sep. 7, 2018

(51) Int. Cl.
H02M 3/157 (2006.01)
H02M 3/158 (2006.01)
H02M 1/00 (2006.01)

(52) U.S. Cl.
CPC ............ *H02M 3/157* (2013.01); *H02M 1/00* (2013.01); *H02M 3/158* (2013.01); *H02M 3/1582* (2013.01); *H02M 2001/0032* (2013.01)

(58) Field of Classification Search
CPC ........ H02M 1/00; H02M 3/157; H02M 3/158; H02M 3/1582; H02M 2001/0032
See application file for complete search history.

(56) References Cited

U.S. PATENT DOCUMENTS

| | | | |
|---|---|---|---|
| 5,180,964 A | 1/1993 | Ewing | |
| RE37,609 E | 3/2002 | Bittner | |
| 6,433,525 B2 * | 8/2002 | Muratov | ............. H02M 3/1563 323/282 |
| 6,452,816 B2 | 9/2002 | Kuranuki et al. | |
| 6,545,882 B2 | 4/2003 | Yang | |
| 6,885,176 B2 | 4/2005 | Librizzi | |
| 7,098,641 B2 | 8/2006 | King | |
| 7,102,339 B1 | 9/2006 | Ferguson | |

(Continued)

FOREIGN PATENT DOCUMENTS

| | | |
|---|---|---|
| CN | 103346663 | 10/2013 |
| CN | 106130344 | 11/2016 |

(Continued)

OTHER PUBLICATIONS

PCT International Search Report and Written Opinion, PCT Application No. PCT/US2009/064618, dated Jan. 13, 2010, 8 pages.

(Continued)

*Primary Examiner* — Matthew V Nguyen
(74) *Attorney, Agent, or Firm* — Saile Ackerman LLC; Stephen B. Ackerman

(57) ABSTRACT

A DC-DC switching converter, with a low IQ hysteretic-PWM automated hybrid control architecture, switching from a first mode to a second mode, when load current changes, is described. The DC-DC switching converter provides a simple architecture for a Boost converter, with efficiency high over the entire load range, and with a hybrid hysteretic-PWM control providing a way to automatically switch between modes, without the addition of a sensing element or system complexity. The switching converter uses a voltage comparator to detect the output current is below a certain threshold. A comparator on the error voltage detects the average value of the error signal with relation to the sawtooth signal. If the average value of the error signal is below a threshold for longer than a programmable timer, the main loop is turned off and the system goes into burst mode.

23 Claims, 5 Drawing Sheets

(56) References Cited

U.S. PATENT DOCUMENTS

| | | |
|---|---|---|
| 7,368,897 B2 | 5/2008 | Qahouq et al. |
| 7,403,400 B2 | 7/2008 | Stanley |
| 7,804,282 B2 | 9/2010 | Bertele |
| 8,018,212 B1 | 9/2011 | Petricek |
| 8,018,743 B2 | 9/2011 | Wang et al. |
| 8,049,481 B2 | 11/2011 | Li et al. |
| 2001/0035745 A1 | 11/2001 | Muratov et al. |
| 2006/0109039 A1* | 5/2006 | Wu ............... H02M 3/33507 327/172 |
| 2006/0273772 A1 | 12/2006 | Groom |
| 2009/0015230 A1 | 1/2009 | Alessandro et al. |
| 2009/0309561 A1* | 12/2009 | Chen ............... H02M 3/156 323/282 |
| 2011/0267018 A1 | 11/2011 | Tao |
| 2012/0013322 A1* | 1/2012 | Dearborn ......... H02M 3/156 323/283 |
| 2013/0335051 A1 | 12/2013 | Le-Hung et al. |
| 2015/0002116 A1 | 1/2015 | Bernon-Enjalbert et al. |
| 2015/0054482 A1* | 2/2015 | Min ............... H02M 3/156 323/283 |
| 2016/0105110 A1 | 4/2016 | Houston et al. |
| 2016/0276931 A1* | 9/2016 | Trichy ............... H02M 3/158 |
| 2016/0294277 A1 | 10/2016 | Romeo |
| 2016/0352228 A1* | 12/2016 | Zhang ............... H02M 1/32 |

FOREIGN PATENT DOCUMENTS

| | | | |
|---|---|---|---|
| DE | 2 323 482 | 11/1974 | |
| EP | 0650249 A1 * | 4/1995 | ............ G05F 1/575 |

OTHER PUBLICATIONS

PCT International Search Report and Written Opinion, PCT Application No. PCT/US2010/023219, dated Apr. 12, 2010, 7 pages.

"Buck-Boost Converter Controlled by Hysteretic PWM Method with Input Voltage Feedforward," by Tomonori Watanabe et al., 2011 IEEE 33rd International Telecommunications Energy Conference (INTELEC), Oct. 9-13, 2011, 6 pages.

German Office Action, File No. 10 2017 212 349.4, Applicant: Dialog Semiconductor (UK) Limited, dated Mar. 13, 2018, 9 pages and English language translation, 7 pages.

Co-pending U.S. Appl. No. 15/475,537, filed Mar. 31, 2017, "Hysteretic Buck-Boost Converter," by Kemal Ozanoglu et al., 42 pages.

* cited by examiner

LOW IQ HYSTERETIC-PWM AUTOMATED HYBRID CONTROL ARCHITECTURE FOR A SWITCHING CONVERTER

RELATED PATENT APPLICATIONS

This application is related to U.S. Pat. No. 8,018,743, filed on Mar. 5, 2009, which has an owner in common with the owner of the instant application and is herein incorporated by reference in its entirety. This application is also related to U.S. Pat. No. 8,049,481, filed on Dec. 29, 2008, which has an owner in common with the owner of the instant application and is herein incorporated by reference in its entirety. This application is related to U.S. patent application Ser. No. 16/124,552, filed on Sep. 7, 2018, which is owned by a common assignee, and is herein incorporated by reference in its entirety.

BACKGROUND

Field

The present disclosure relates generally to a DC-DC switching converter, and more specifically to hybrid hysteretic Pulse-Width Modulation (PWM) control.

Background

For DC-DC converters, it is hard to achieve a good level of performance over the whole range of applicative conditions, especially over the whole range of output current. If a DC-DC switching converter is designed to provide good performance, minimizing voltage ripple and maximizing efficiency in the middle-high range of output current, usually a degradation of performance is to be accepted at light loads and vice versa, unless different control schemes are appropriately designed to support different load current ranges.

There are techniques to make sure DC-DC converters get the benefits of normal Pulse-Width Modulation (PWM) control in the middle-high range of output current, while utilizing a different control, for example utilizing Pulse-Frequency Modulation (PFM) when the output load falls below a certain threshold and switching losses are dominant. This approach is easily implementable if the information on the output current is accessible, so that it is known when to switch from one control to another. Sometimes this information is provided by the system that's hosting the converter, other times it is not. Extrapolating accurate information on the output current to detect that it has fallen below a certain threshold can be challenging without the aid of additional sensing elements. This is especially true for Boost converters where there is no direct correlation between input current and output current, and where part of the analog information needed to extrapolate the level of output current is in the high voltage domain.

Examples of providing smooth transitions between Pulse-Frequency Modulation (PFM) and PWM, without a direct measurement of the output current, are included in the above-mentioned U.S. Pat. Nos. 8,018,743 and 8,049,481.

SUMMARY

Accordingly, it is an object of one or more embodiments of the present disclosure to provide a low quiescent current (IQ) hysteretic-PWM automated hybrid control architecture, in a DC-DC switching converter.

It is a further object of one or more embodiments of the disclosure to provide a low IQ converter that achieves a high efficiency over the load range, when switching from a first mode to a second mode.

Still further, it is an object of one or more embodiments of the disclosure to provide a way to automatically switch between two control architectures, without the addition of a sensing element or added system complexity.

Other objects will appear hereinafter.

The above and other objects of the present disclosure may be accomplished in the following manner. A circuit for a DC-DC converter, with a low IQ hysteretic-PWM automated hybrid control architecture, is disclosed, comprising a skip comparator, idle comparators, further comprising an over voltage comparator and an under voltage comparator, and an error amplifier, further comprising an error voltage. The circuit comprises control logic, further comprising a first timer configured to measure a duration of a skip comparator output, for setting a first mode control signal, and a second timer configured to measure a duration of the BURST magnetization, for setting a second mode control signal. The circuit comprises a high side device, connected between a node voltage and an output voltage, and a low side device, connected between ground and the node voltage, further comprising a gate controlled by the control logic. The circuit comprises a current sensing device, connected between ground and the node voltage, providing a load current.

The above and other objects of the present disclosure may be further accomplished by a method for a DC-DC switching converter, with a low IQ hysteretic-PWM automated hybrid control architecture. The steps include operating the converter in a PWM (Pulse Width Modulation) mode, using PWM logic. The steps also include switching the converter to a hysteretic mode and turning off the PWM logic during the hysteretic mode.

In various embodiments the function may be achieved with a synchronous switching converter.

In various embodiments the function may be achieved with an asynchronous switching converter.

In various embodiments the function may be achieved with current mode control in the switching converter.

In various embodiments the function may be achieved with voltage mode control in the switching converter.

In various embodiments the function may be achieved with a multimode switching converter system.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DETAILED DESCRIPTION

There are cases where a DC-DC switching converter is required to provide maximum efficiency in a range of current where PWM is the supported mode, while providing low quiescent current (IQ), drawn by the switching converter in a no-load but enabled condition, at zero or very low output current.

This is challenging, as the circuits needed in PWM are power hungry. In such a switching converter, the main focus is not to provide accurate transitions between modes, but rather to find a way to disable the power-hungry circuits in the range of load current where PWM is not needed, and to replace the PWM control with low-power-demand control.

The present disclosure provides an inexpensive solution that doesn't require additional analog/digital function, and exploits information already in the system. With its hybrid control architecture, the traditional PWM switching converter can achieve high performance at high output current, while consuming low power at zero/light load and improving efficiency in the light load range.

The disclosure provides for a DC-DC switching converter, having low IQ hysteretic-PWM automated hybrid control that switches between a first mode and a second mode when load current changes. The proposed solution provides for a simple architecture, whose efficiency is high over the entire load range, and utilizes a way to automatically switch without adding a sensing element or added system complexity.

The switching converter of the disclosure uses a voltage comparator to detect the output current is below a certain threshold. A comparator on the error voltage detects the average value of the error signal with relation to the sawtooth signal, for a given condition in PWM. If on average the error signal is below a threshold for longer than a programmable timer, the main loop is turned off and PWM control is replaced by a hysteretic control. In the example shown here, the hysteretic mode is supported by constant on time bursts.

Figure 1:
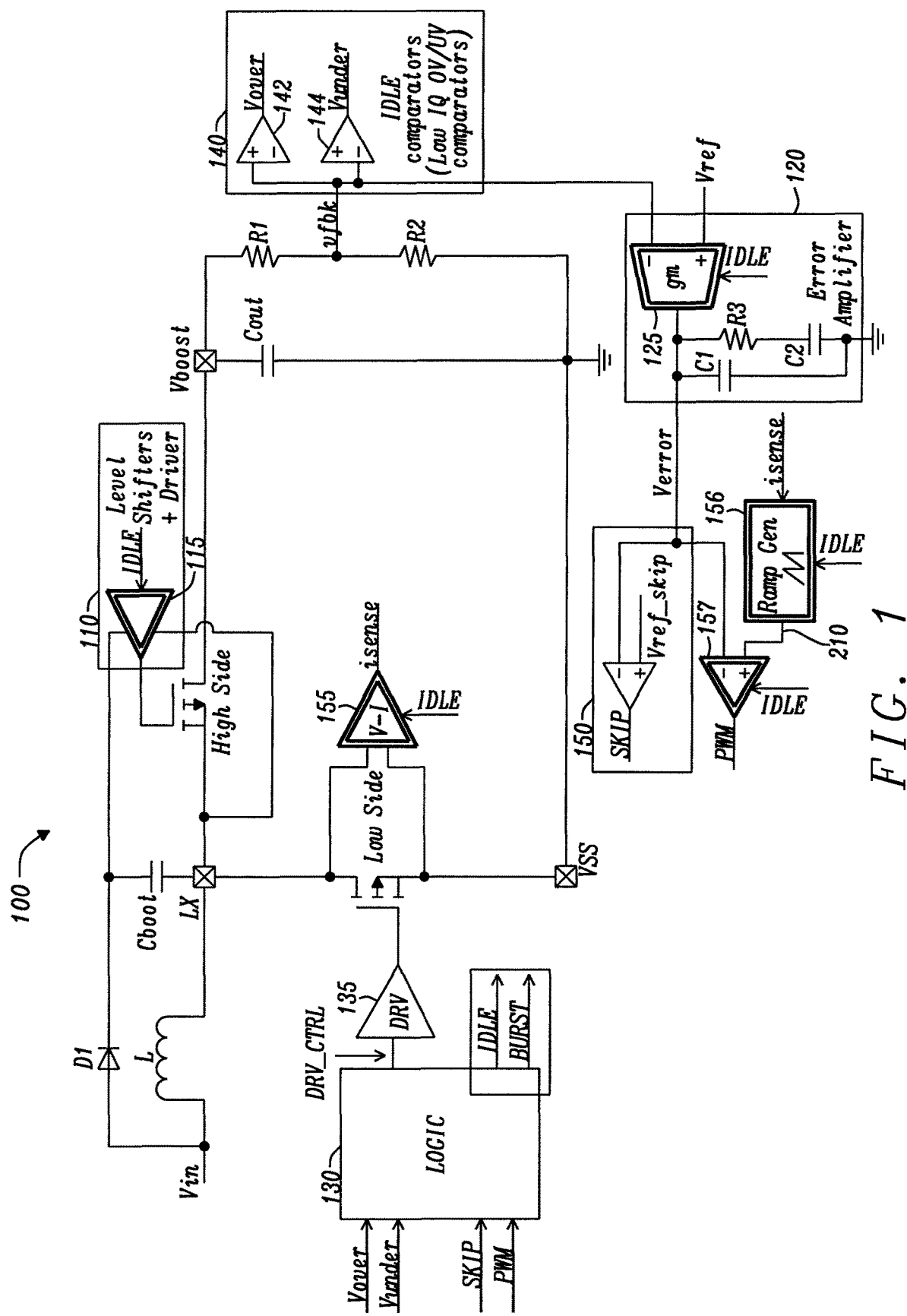
FIG. 1 illustrates a Boost switching converter of the present disclosure, utilizing low IQ hysteretic-PWM automated hybrid control.

FIG. 1 illustrates 100, a Boost switching converter of the present disclosure, utilizing low IQ hysteretic-PWM automated hybrid control. While a Boost converter is shown, the principles of the disclosure could also be applied to other DC-DC switching converter types, including Buck and Buck-Boost converters, as well as to flyback converters. The basic synchronous Boost converter includes Low Side and High Side devices, and bootstrap capacitor Chboot, connected between the cathode of diode D1, and node voltage LX. Inductor L is connected between input voltage Vin, also the anode of diode D1, and LX. Output capacitor Cout is connected between output voltage Vboost and ground. High Side device has its source at LX, and its drain at Vboost, and Low Side device has its source at VSS, and its drain at LX. The High Side and Low Side devices may be NMOS type devices.

Current mode control in FIG. 1 comprises current sensing device V-I 155, error amplifier 120, Ramp gen 156, and PWM comparator 157. IDLE comparators 140 comprise over voltage (OV) comparator 142 and under voltage (UV) comparator 144, and determine threshold Vover and threshold Vunder, respectively. Under voltage and over voltage comparators have good matching as they share the input stage but are used only for the hysteretic control.

Signals Vover and Vunder, SKIP output from skip comparator 150, and PWM output from comparator 157, comprise inputs to hysteretic-PWM control logic 130. The outputs of logic 130 comprise signals IDLE and BURST, and the main control signal DRV_CTRL driving the gate of the Low Side device through driver 135. Sensing device V-I is connected across the source and drain of the Low Side device, and outputs current sense signal isense.

BURST is generated by the control logic. When BURST is 1, logic outputs a series of TON pulses at DRV_CTRL, to turn the low side on. When Vboost hits the over voltage threshold, the TON pulses are stopped and BURST goes to zero. The signal BURST in FIG. 1 is shown to point out how the control logic switches back to PWM mode, based on the duration of the BURST signal.

Signal IDLE turns off all the devices shown in FIG. 1 with double-solid lines, i.e. sensing device V-I 155, amplifier gm 125, Ramp gen 156, PWM comparator 157, and level shifter 115 in 110, at the gate of the High Side device, during IDLE mode. Turning off these devices during an IDLE period results in significant reduction in switching current, and thus improves efficiency, at low loads.

IDLE is an enable signal. In case of gm amplifier 125 and V-I block 155, these are sent into a low bias mode, meaning that the IDLE signal reduces the bias of the block, to keep it active but with a very small current. The IDLE signal is used to either disable blocks or to send them into a low power mode.

Output feedback voltage Vfbk is located between the resistors of voltage divider R1/R2, and drives IDLE comparators 142 and 144, at non-inverting and inverting inputs, respectively. Vfbk also drives amplifier gm 125, of the error amplifier. The output of the gm amplifier is connected at one end of capacitor C1 and resistor R3. The other end of capacitor C1 is connected to ground, and the other end of resistor R3 is connected to capacitor C2, also connected to ground.

The current mode control architecture is clocked with a constant frequency. Every switching cycle, amplifier gm 125 receives Vfbk at the inverting input, and reference voltage Vref at the non-inverting input. The comparison of these two signals generates error signal Verror, at the output of error amplifier 120.

The sawtooth signal output from Ramp Gen 156 is determined by the summation of current sense signal isense and a compensation ramp, whose slope is opportunely designed to suppress subharmonic oscillations at high duty cycles. PWM comparator 157 compares Verror at the inverting input, to the output of Ramp Gen at the non-inverting input, and generates signal PWM. PWM is input to control logic 130, and determines how long inductor L is magnetized within a switching cycle when the current mode control is enabled. PWM is characterized by a constant switching frequency, plus a loop that varies the duty cycle duration of the magnetization. Skip comparator 150 compares Verror at the inverting input, to reference votlage Vref_skip at the non-inverting input, and generates signal SKIP. SKIP is also input to control logic 130.

Vref_skip is a voltage reference that is generated internally, derived from a bandgap reference. IDLE is generated by a simple counter in the logic, which counts how many switching cycles Verror<Vref_skip, that is how many switching cycles SKIP=1.

PWM control usually leads to good performance in the middle/high range of output current, but requires relatively high current. PWM control is also power hungry, meaning that the power it takes is comparable with the power delivered at the output, in the middle/light load range. Furthermore, PWM control, without the features of the disclosure, can struggle to deliver good efficiency at light load, where the switching losses are predominant, and where the current taken by the control starts having an impact. It is therefore natural to design multimode switching converters where the PWM control is shut off at light load, and a more efficient control is provided. The architecture of the present disclosure provides a very simple way to achieve a low IQ and light load efficiency improvement, without adding complexity.

Note that the present disclosure can be generalized from the synchronous Boost type switching converter in FIG. 1, to any type switching converter including an asynchronous architecture, and that the current mode control concept can apply to voltage mode control, as well.

Figure 2:
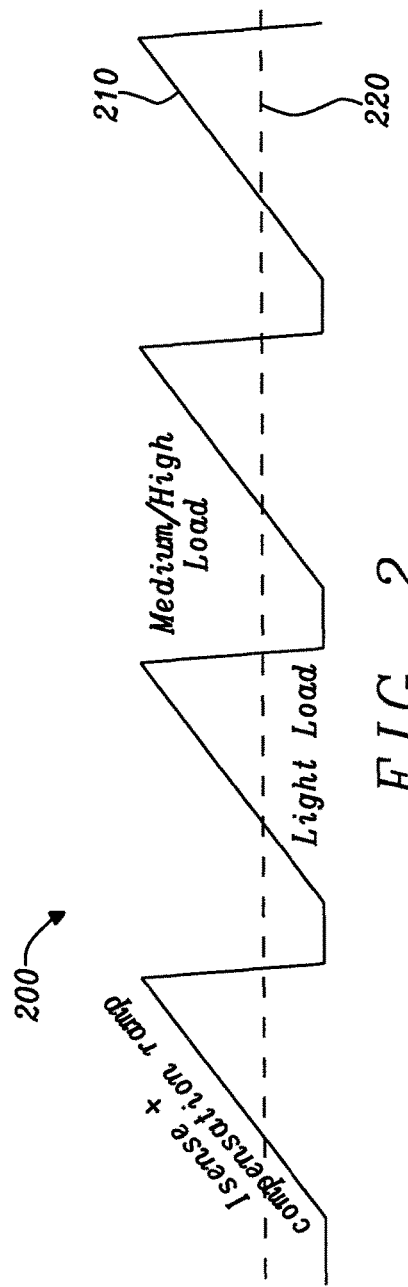
FIG. 2 includes waveforms for the PWM comparator of the switching converter of the disclosure, at various loads.

FIG. 2 shows 200, where the position of the error signal with respect to the sawtooth signal in the PWM comparator, gives an indication of the range of output current the converter is delivering, assuming the output voltage is constant over the load range. The sawtooth signal output 210 of Ramp Gen 156 is determined by the summation of current sense signal isense and a compensation ramp. PWM comparator 157 compares Verror to the Ramp Gen output 210, and generates signal PWM. For the conditions of input voltage Vin, output voltage Vboost, and external components, the lower the output current, the closer to the bottom pedestal of the sawtooth Verror will be, and the lower the duty cycle. For this light load area, PWM control is inefficient, because switching losses are dominating. It is in this light load area where the switching converter provides energy on the output, with minimum switching activity. In the disclosure, SKIP comparator 150 and voltage reference Vref_skip are opportunely placed in the light load area of the sawtooth signal.

The SKIP comparator compares Verror with a reference voltage Vref_skip. The sawtooth swing range, the voltage of the saw tooth from pedestal to peak as shown in FIG. 2 is given by the conditions. Vref_skip is chosen to be a voltage close to the bottom value of the sawtooth, so that when the SKIP comparator is flagging the condition Verror<Vref_skip this means Verror is in the light load range of operation.

Figure 3A:
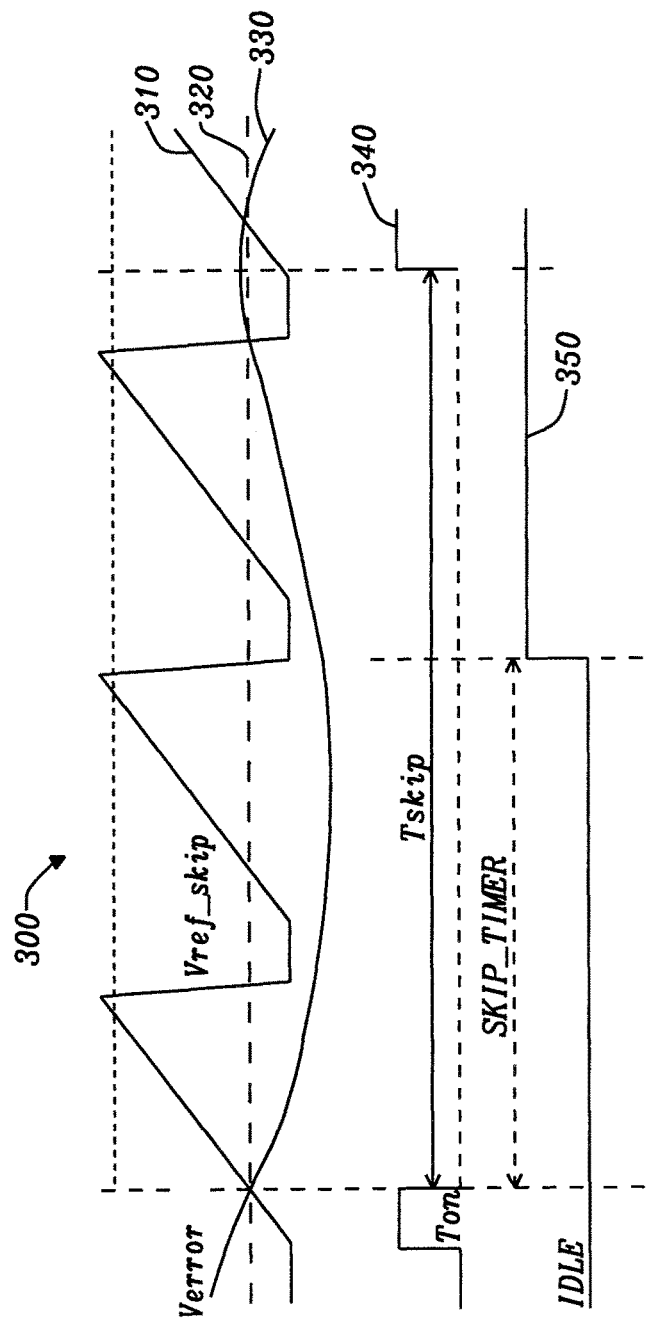
FIG. 3A includes waveforms for the skip comparator of the switching converter of the disclosure, at various loads.

FIG. 3A illustrates 300, when Verror 330 is compared to the Vref_skip 320 in skip comparator 150. The sawtooth signal output 310 of Ramp Gen 156 is determined by the summation of current sense signal isense and a compensation ramp. The output of skip comparator 150 instructs control logic 130 to SKIP magnetizing inductor L every time for as long as Verror=<Vref_skip. By doing so, the system will settle for a steady-state condition where in the vicinity of the light load, the inductor will be magnetized enough not to have the need to magnetize, for a following number of cycles that depends on the output current. The system is no longer switching at constant frequency, but it is decreasing its frequency by increasing Tskip in 340, as the current decreases. This mode is called Pulse-Skipping Mode (PSM). Switching losses are saved, and the efficiency increases, as compared to a system where the PWM loop switches at a small duty cycle, every switching cycle. The focus of the disclosure is the way PSM is implemented, and the way the same implementation is exploited as a way to switch modes, by using simple finite state machine (FSM) control logic in logic 130.

Consider when the PWM loop is still on and taking current, when 340 is controlled by the skip comparator. The skip comparator instructs the PWM loop to skip magnetizing the coil when Verror<Vref_skip. The control logic keeps DRV_CTRL at zero, and the coil is not magnetized. The more the output current decreases the more pulses are skipped. Digital control in logic 130 measures the frequency of the PSM, by measuring the duration of SKIP provided by the skip comparator. It sets a threshold below which the system switches off the power hungry blocks of the PWM control. A simple hysteretic control takes over by setting signal IDLE 350 to 1, for IDLE mode, when the system is not switching for longer than SKIP_TIMER, Tskip>SKIP_TIMER.

SKIP_TIMER is a configurable timer that depends on the conditions. The smaller the SKIP_TIMER, the higher the load current is at which the circuit switches to hysteretic mode. For the time when Verror<Vref_skip, the output of the skip comparator, Tskip, is on, and the coil is not magnetized. Another counter measures the duration of the output of the skip comparator. When IDLE is set to 1, logic blocks are turned off, and the circuit enters hysteretic mode. If the output hits the under voltage threshold, a burst of TON pulses is provided to the DRV_CTRL signal, to repeatedly magnetize the coil until the output hits the over voltage threshold. For the duration of BURST, the signal BURST is set to 1, and a counter measures its duration. If it is higher than BURST_TIMER, then IDLE is set to 0, logic blocks are turned back on, and the system works in PWM mode, as shown in FIG. 3C.

Figure 3B:
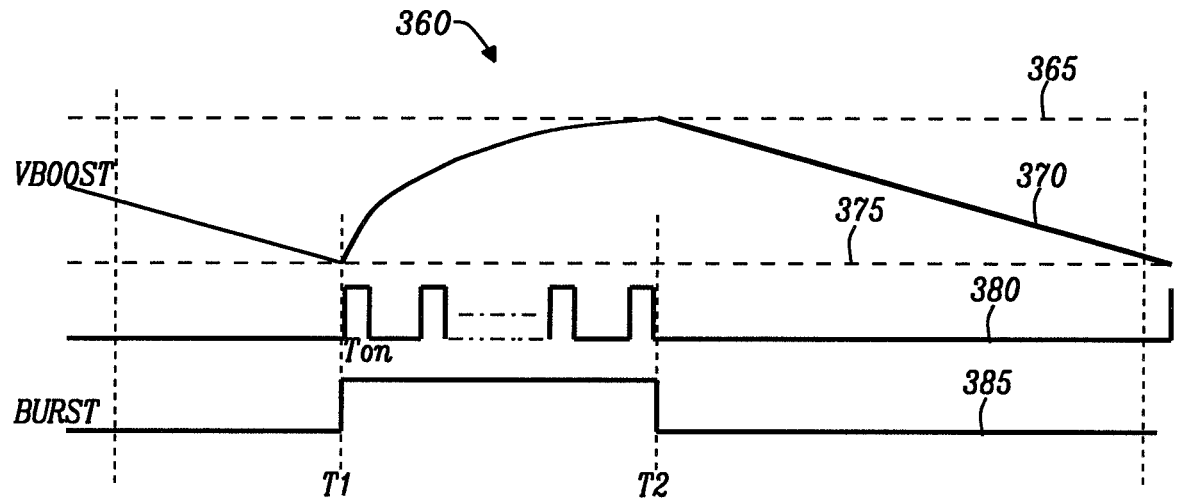
FIG. 3B shows waveforms illustrating operation of the hysteretic control logic of the disclosure.
Figure 3C:
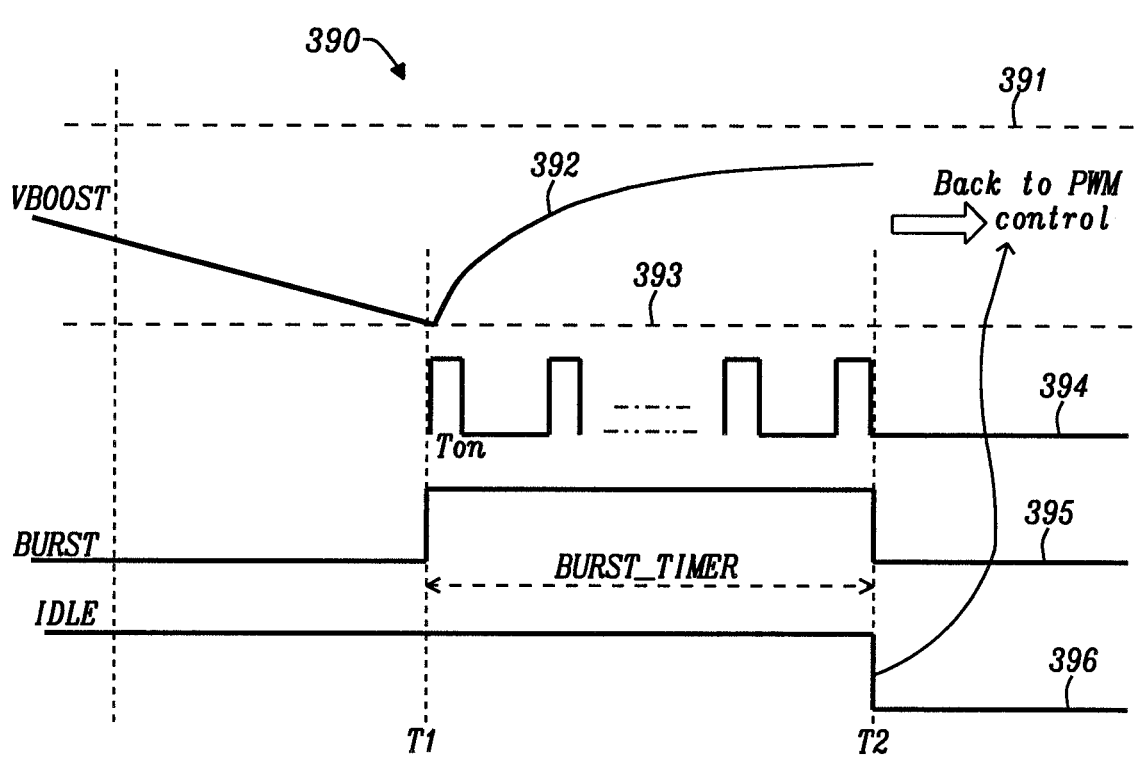
FIG. 3C includes waveforms for the switching converter of the disclosure, at various loads, including operation in both hysteretic and PWM modes.

FIG. 3B shows 360, the operation of the hysteretic, control logic. When switching converter output Vboost 370 falls below Vunder threshold 375 at T1, BURST 385 turns on constant pulses TON 380, magnetizing the inductor. When Vboost hits the under voltage threshold, signal BURST is set to 1, and DRV_CTRL receives a burst of TON pulses generated by the internal clock of the control logic. Signal DRV_CTRL acts directly on the gate of the Low Side device, to turn it on and off.

When output Vboost reaches Vover threshold 365 at T2, and BURST turns off constant pulses TON, the system is in a non-switching state until the output hits the under voltage threshold again. During BURST, the coil is magnetized with TON=1 and demagnetized with TON=0, where BURST is a quick succession of magnetization and demagnetization to charge the output. The clock determines the pulse period of TON, where the duration is chosen opportunely for the conditions. With the hysteretic PWM automated hybrid control of the disclosure, the output is kept at the desired value with minimum IQ, and the distance between under voltage and over voltage thresholds determines the voltage ripple.

The following control is used to switch from PWM to hysteretic control:
1) A programmable Vref_Skip is chosen above the pedestal of the sawtooth. The higher the Vref_skip, the larger the output load threshold at which the switching converter will start skipping pulses. Vref_skip can be made adaptive with Vin and Vboost, if the threshold needs to have small variations over the conditions.
2) The SKIP signal is fed back to control logic 130. The logic measures the duration of the SKIP signal, Tskip, through a programmable timer SKIP_TIMER, which can be made variable with the conditions.
3) If the system skips pulses for longer than SKIP_TIMER, for example when Verror<Vref_skip for longer than SKIP_TIMER, the output current is low enough to switch to hysteretic control. Logic 130 will set signal IDLE, which will disable/set to low power mode the power hungry blocks used for PWM control (115, 125, 155, 156, 157). In IDLE mode, hysteretic control takes place. If the output drops below the under voltage threshold, current will be pulsed in the inductor at constant TON time in BURST mode, until the over voltage threshold is reached, and no switching activity will follow until the next under voltage.

To reverse the PWM control, it is enough to notice that if the output current increases while the hysteretic control is in place, and bursting is continued at constant TON, the number of bursts increases. The digital control will then measure the duration of the BURST phase, and revert to PWM control when it exceeds an appropriate value.

FIG. 3C illustrates 390, when control logic 130 switches from hysteretic to PWM control at time T2. When IDLE 396 is high in IDLE mode, and after Vunder threshold 393 is reached at T1, the system bursts current in constant pulses TON 394. BURST 395 goes high, and if BURST is longer than BURST_TIMER, made variable with conditions, IDLE mode is exited and IDLE 396 goes low at T2. This occurs when the output current is high enough for output Vboost 392 to take long enough to reach Vover threshold 391. This information stops the hysteretic activity, and setting IDLE to 0 reactivates the PWM control, and normal PWM operations resume.

The durations of SKIP_TIMER in FIG. 3A and BURST_TIMER in FIG. 3B are designed such that the transition between PWM control mode and IDLE mode is seamless for the disclosure. The durations are related to the specifications and the conditions, as well as the load current threshold at which the system switches from hysteretic back to PWM. Once VIN, L, COUT and VOUT are fixed, it is a simple calculation to determine what value SKIP_TIMER should be to switch from PWM to hysteretic at a first load current, and what BURST_TIMER should be to switch from hysteretic back to PWM at a second load current.

Figure 4:
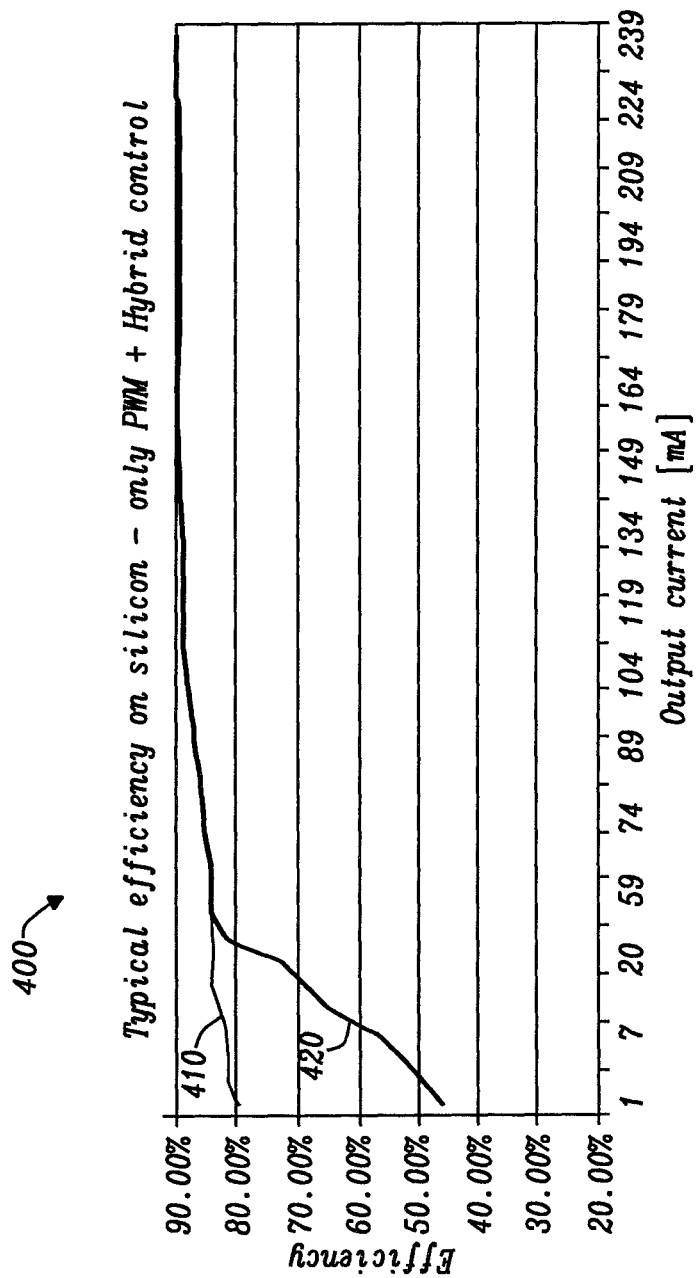
FIG. 4 shows a measurement of typical efficiency on silicon, with only PWM control compared to low IQ hysteretic-PWM automated hybrid control.

FIG. 4 400 shows a measurement of typical efficiency on silicon, with only PWM control compared to low IQ hysteretic-PWM automated hybrid control. The low IQ hysteretic-PWM automated hybrid control reduced the IQ of a Boost switching converter of this particular design from the 300-500 uA range to <20 uA, and increased the efficiency. This can be seen in 410, for IDLE and PWM hybrid control at light loads, where the efficiency increased up to 30%, compared to 420, for only PWM control at light loads.

The disclosed circuit operates in either PWM or hysteretic mode. Transitions occur as follows:

1. While in PWM mode, but prior to a transition to hysteretic mode, the switching converter moves from PWM to PSM, where skipping starts, and then ends, when SKIP_TIMER is exceeded. PSM is a part of PWM, and the PWM is still comparing Verror to Vramp to determine the duty cycle. If Verror is lower than Vref_skip the PWM decision is overridden, and magnetizing the coil is skipped. That is, while the PSM skipping operation is performed, the skipping duration is measured, and the mode moves to hysteretic when the skipping duration is longer than SKIP_TIMER.
2. Hysteretic mode is entered when SKIP_TIMER is exceeded. Once in hysteretic mode, the circuit switches the PWM control off. Hysteretic mode is also referred to herein as IDLE mode, and while in Hysteretic/IDLE mode, BURST mode is the mode that supports the output voltage. When the system doesn't switch, the output capacitance discharges, the under voltage comparator detects this, and recharges it by sending a train of pulses in BURST mode. The over voltage comparator detects and signals when to stop BURST mode. To summarize, when the system is in Hysteretic/IDLE mode, BURST mode is active as a way to perform the hysteretic control, to decide how often to magnetize the coil, and how long not to by means of a TON signal, an under voltage comparator and an over voltage comparator.
3. The switching converter returns to PWM mode, and IDLE mode with BURST mode, or the hysteretic control, ends when BURST_TIMER is exceeded.

To summarize, while in PWM mode, the disclosed circuit operates in PSM, including as it transitions to hysteretic mode. Then once in hysteretic mode, it doesn't utilize PSM or skip mode, but instead operates in BURST mode, when an under voltage is reached. Once it returns to PWM mode, BURST mode turns off.

PSM operates with PWM control, to save switching losses at a lower output current. IDLE mode is an extension of this, and once skipping starts in PSM, when the PWM blocks are still active and drawing current, Tskip is defined appropriately to switch the PWM control altogether.

Once skipping occurs for a time Tskip>SKIP_TIMER, the disclosed circuit switches to a simpler control, i.e. hysteretic control, supported by BURST or IDLE mode, so named because many analog blocks are idle, i.e., either off or in low power mode. Then a way is needed to detect when the output current is increasing, and it is time to switch back to PWM.

While in Hysteretic/IDLE mode, signal BURST is generated and set to 1 for the whole duration of bursting. TON magnetizes the coil after an under voltage flag is detected, waiting for the output to be charged back to an over voltage threshold once the duration of the BURST signal exceeds BURST_TIMER, the output current is considered high enough for the PWM control to be more appropriate than the Hysteretic/IDLE control, and PWM mode resumes.

Figure 5:
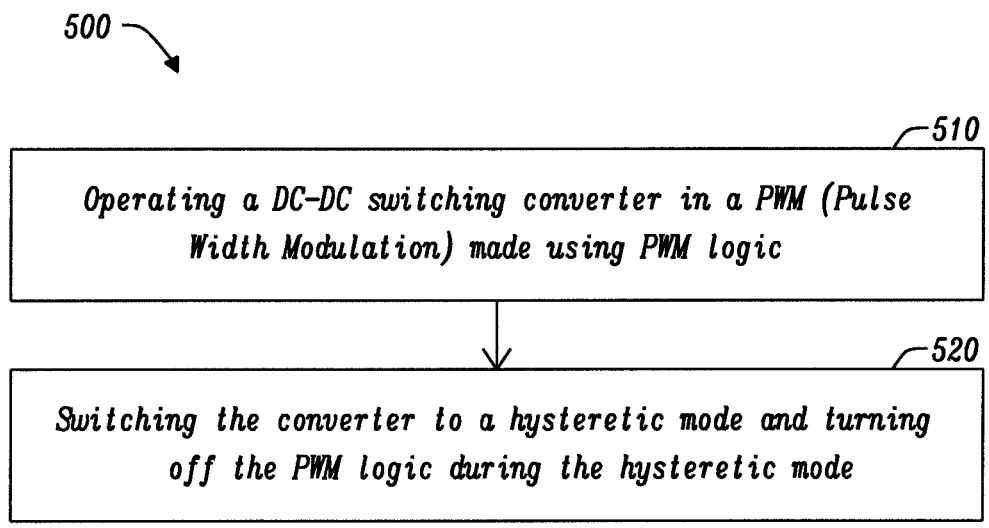
FIG. 5 is a flow chart of a method for a DC-DC converter, with a low IQ hysteretic-PWM automated hybrid control architecture.

FIG. 5 is flow chart 500 of a method for a DC-DC switching converter, with a low IQ hysteretic-PWM automated hybrid control architecture. The steps include 510, operating the converter in a PWM (Pulse Width Modulation) mode, using PWM logic. The steps also include 520, switching the converter to a hysteretic mode and turning off the PWM logic during the hysteretic mode.

The advantages of one or more embodiments of the present disclosure include simplicity, and the ability to add to any PWM operating switching converter, to reduce IQ, and improve efficiency in the light load range, with minimal effort/silicon area.

While particular embodiments of the present disclosure have been illustrated and described, it will be understood by those skilled in the art that various changes in form and details may be made without departing from the spirit and scope of the invention.

The invention claimed is:

1. A DC-DC switching converter, with a low quiescent current (IQ) hysteretic-PWM automated hybrid control architecture, comprising:
   Pulse Width Modulation (PWM) logic configured to be used during a PWM mode; idle comparators, comprising an over voltage comparator and an under voltage comparator, at an output of said switching converter;
   control logic, configured to switch from said PWM mode to a hysteretic mode, wherein said idle comparators are used, and said PWM logic is turned off, during said hysteretic mode; and a skip comparator, configured to compare an error voltage, output from a gm amplifier, and a programmable skip voltage reference.

2. The switching converter of claim 1, wherein said control logic further comprises a skip timer configured to use an output of said skip comparator to determine when to switch to said hysteretic mode.

3. The switching converter of claim 1, wherein said hysteretic mode is entered when said error voltage is less than or equal to said programmable skip voltage reference for longer than a skip time.

4. The switching converter of claim 1, wherein said control logic is configured to enter a pulse skip mode when said error voltage falls below said programmable skip voltage reference.

5. The switching converter of claim 4, wherein said control logic further comprises a burst timer configured to measure a duration of a burst of pulses, wherein when said duration of a burst of pulses exceeds said burst timer, said hysteretic mode is ended and said PWM mode is resumed.

6. The switching converter of claim 1, wherein said Pulse Width Modulation (PWM) logic comprises a ramp generator, comprising an input from a current sense device.

7. The switching converter of claim 6, further comprising a pulse width modulation comparator, configured to receive said error voltage on its inverting input and an output from said ramp generator on its non-inverting input.

8. The switching converter of claim 1, wherein said control logic inputs comprise outputs of said over voltage comparator and said under voltage comparator, said output of said skip comparator, and a pulse width modulation comparator output.

9. The switching converter of claim 1, wherein said gm amplifier comprises a feedback voltage on its inverting input and a voltage reference on its non-inverting input.

10. The switching converter of claim 9, further comprising a voltage divider configured to provide said feedback voltage.

11. The switching converter of claim 1, further comprising a diode connected between an input voltage and a level shifter, a bootstrap capacitor connected between said diode and a node voltage, and a high side device having a gate controlled by said level shifter.

12. The switching converter of claim 11, further comprising an inductor connected between said input voltage and said node voltage.

13. The switching converter of claim 1, wherein said switching converter is a synchronous switching converter.

14. The switching converter of claim 1, wherein said switching converter is an asynchronous switching converter.

15. The switching converter of claim 1, wherein the DC-DC switching converter is configured for voltage mode control.

16. The switching converter of claim 1, wherein the DC-DC switching converter is configured for current mode control.

17. The switching converter of claim 1, wherein the DC-DC switching converter is a multimode switching converter system.

18. The switching converter of claim 1, wherein the DC-DC switching converter is a Buck, Buck-Boost, or a flyback switching converter.

19. A method for operating a DC-DC converter, with a low quiescent current (IQ) hysteretic-PWM automated hybrid control architecture, comprising:
    operating said converter in a PWM (Pulse Width Modulation) mode, using PWM logic;
    comparing an error voltage, output from a gm amplifier, and a programmable skip voltage reference, with a skip comparator; and
    switching said converter to a hysteretic mode and turning off said PWM logic during said hysteretic mode.

20. The method of claim 19, wherein a skip timer uses an output of said skip comparator to determine when to switch to said hysteretic mode.

21. The method of claim 19, wherein when said error voltage is less than or equal to said programmable skip voltage reference, a pulse skip mode is entered.

22. The method of claim 19, wherein during said hysteretic mode a burst mode is entered, when an output of said switching converter drops below an under voltage threshold, and an output voltage moves between said under voltage threshold and an over voltage threshold.

23. The method of claim 19, wherein a burst timer measures a duration of a burst of pulses, wherein when said duration of a burst of pulses exceeds said burst timer, said hysteretic mode is ended and said PWM mode is resumed.

* * * * *